United States Patent
Noldus

(10) Patent No.: US 9,071,669 B2
(45) Date of Patent: Jun. 30, 2015

(54) METHOD AND NETWORK NODE FOR MONITORING A QUALITY OF MEDIA TRANSFER IN A SESSION INITIATION PROTOCOL BASED VOICE OVER INTERNET PROTOCOL COMMUNICATIONS NETWORK

(75) Inventor: Rogier August Caspar Joseph Noldus, Goirle (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 336 days.

(21) Appl. No.: 13/519,411

(22) PCT Filed: Feb. 5, 2010

(86) PCT No.: PCT/EP2010/051449
§ 371 (c)(1),
(2), (4) Date: Jul. 9, 2012

(87) PCT Pub. No.: WO2011/095221
PCT Pub. Date: Aug. 11, 2011

(65) Prior Publication Data
US 2012/0281579 A1 Nov. 8, 2012

(51) Int. Cl.
*H04L 29/06* (2006.01)

(52) U.S. Cl.
CPC ............ *H04L 65/80* (2013.01); *H04L 65/1006* (2013.01)

(58) Field of Classification Search
USPC ............................ 370/252, 253; 709/223, 224
See application file for complete search history.

(56) References Cited

U.S. PATENT DOCUMENTS

| 7,961,714 B1* | 6/2011 | Watson et al. | 370/352 |
| 2007/0288630 A1* | 12/2007 | De Noia et al. | 709/224 |
| 2008/0215704 A1* | 9/2008 | Curcio et al. | 709/217 |
| 2009/0268713 A1* | 10/2009 | Ottur et al. | 370/352 |

FOREIGN PATENT DOCUMENTS

WO  2005088931 A1  9/2005

OTHER PUBLICATIONS

Pendleton, A. Clark; Telchemy Incorporated A Johnston Avaya H. Sinnreich Adobe Systems A et al.: Session Initiation Protocol Event Package for Voice Quality Reporting; draft-ietf-sipping-rtcp-summary-08.txt: Internet Engineering Task Force, IETF; Standworkingdraft, Internet Society (ISOC) 4, rue des Falaises Ch-1025, Geneva, Switzerland, Jan. 9, 2010, pp. 1-40, No. 8; XP015067473 (retrieved on Jan. 9, 2010).

(Continued)

*Primary Examiner* — Pao Sinkantarakorn
(74) *Attorney, Agent, or Firm* — Coats & Bennett, PLLC

(57) ABSTRACT

Method and network node for monitoring a quality of media transfer in a SIP based VoIP communications network comprising a first and second network node. The method includes the step of collecting, by the first network node, information representative of the quality of media transfer on the user plane, such as information included in one or more RTCP messages related to that media transfer, and including, by the first network node, in a SIP message said information representative of the quality of media transfer on the user plane. The method further includes transmitting the SIP message from the first network node to the second network node, and storing in a repository associated with the second network node the information representative of the quality of media transfer on the user plane.

22 Claims, 10 Drawing Sheets

(56) References Cited

OTHER PUBLICATIONS

Rosenberg, J., Schulzrinne, H., "An Offer/Answer Model with the Session Description Protocol (SDP)", Network Working Group, Request for Comments: 3264, Standards Track, The Internet Society, pp. 1-18, Jun. 2002.
Rosenberg, J., et al., "SIP: Session Initiation Protocol", Network Working Group, Request for Comments: 3261, Standards Track, The Internet Society, pp. 1-140, Jun. 2002.
Rosenberg, J., Schulzrinne, H., "Reliability of Provisional Responses in the Session Initiation Protocol (SIP)", Network Working Group, Request for Comments: 3262, Standards Track, The Internet Society, pp. 1-10, Jun. 2002.
Schulzrinne, H., Casner, S., Frederick, R., Jacobson, V., "RTP: A Transport Protocol for Real-Time Applications", Network Working Group, Request for Comments: 3550, Standards Track, The Internet Society, pp. 1-89, Jul. 2003.
Schulzrinne, H., Casner, S., "RTP Profile for Audio and Video Conferences with Minimal Control", Network Working Group, Request for Comments: 3551, Standards Track, The Internet Society, pp. 1-38, The Internet Society, Jul. 2003.
Handley, M., Jacobson, V., "SDP: Session Description Protocol", Network Working Group, Request for Comments: 4566, Standards Track, The Internet Society pp. 1-49, Jul. 2006.
3RD Generation Partnership Project, "Digital Cellular Telecommunications system (Phase 2+); Universal Mobile Telecommunications System (UMTS); Voice Call Continuity (VCC) between Circuit Switched (CS) and IP Multimedia Subsystem (IMS); Stage 2 (3GPP TS 23.206 version 7.5.0 Release 7)", Technical Specification, ETSI, Sophia Antipolis Cedex, France, Jan. 2008.
3RD Generation Partnership Project, "Digital Cellular Telecommunications System (Phase 2+); Universal Mobile Telecommunications System (UMTS); LTE; Single Radio Voice Call Continuity (SRVCC); Stage 2 (3GPP TS.23.216 version 10.1.0 Release 10)", Technical Specification, ETSI, Sophia Antipolis Cedex, France, Jun. 2011).

* cited by examiner

```
Message body
    Session Description Protocol
        Session Description Protocol Version (v): 0
        Owner/Creator, Session Id (o): 9400 123456 4 IN IP4 164.48.62.71
        Session Name (s): A conversation
        Connection Information (c): IN IP4 164.48.62.71
        Time Description, active time (t): 0 0
        Media Description, name and address (m): audio 7078 RTP/AVP 0 98 8 101
        Media Attribute (a): rtcp:7079
        Media Attribute (a): sendrecv
        Media Attribute (a): rtpmap:98 iLBC/8000
        Media Attribute (a): rtpmap:101 telephone-event/8000
        Media Attribute (a): fmtp:101 0-15
        Media Attribute (a): QMTReportRequested
```

Fig. 6

METHOD AND NETWORK NODE FOR MONITORING A QUALITY OF MEDIA TRANSFER IN A SESSION INITIATION PROTOCOL BASED VOICE OVER INTERNET PROTOCOL COMMUNICATIONS NETWORK

TECHNICAL FIELD

The invention relates to a method and network nodes for monitoring a quality of media transfer in a Session Initiation Protocol based Voice over Internet Protocol communications network comprising a first and second network node.

BACKGROUND

When a Session Initiation Protocol (SIP) session is established by a SIP user agent (UA) or towards a SIP UA, a codec negotiation may take place between the calling party and the called party. The calling party and the called party agree on codec(s) to be used for the voice transport and/or video transport, assuming the call is a voice call, video call, audio streaming session or video streaming session. The codec(s) to be used during the call are described in the Session Description Protocol (SDP). SDP is included in the SIP messages that are exchanged in the control plane during call establishment. SDP may also be included in SIP messages that are exchanged in the control plane during the active phase of a call, e.g. when one of the call parties wishes to add or remove codecs to or from, respectively, the negotiated set of codecs.

The SIP messages traverse a number of signalling proxies, between the calling party and the called party. These proxies may check the SDP (codec) that is negotiated and record this information in a call record for usage off line, such as charging and/or statistics.

A SIP Application Server (SIP-AS) may generate a call record, e.g. at the end of the call. The call record may contain details about the call, such as an identification of calling party, an identification of the called party, a calling party location and a call duration. The call record may also contain the negotiated SDP.

During the session the control plane carries SIP messages, while the user plane carries media, such as voice and/or video. The control plane does not carry such media. The user plane does not carry SIP messages.

SUMMARY

Session Initiation Protocol (SIP), more in particular Internet Protocol Multimedia Subsystem (IMS), is used increasingly as communications methodology for voice, video and other forms of communication. The success of IMS will depend, among others, on the quality of service (QoS). The quality of service includes the quality of the media transfer, including voice and video (both conversational and streaming). Quality of media transfer of voice and video depends, among others, on the topology of the Internet Protocol (IP) infrastructure used for the media transfer. Public operators are installing designated IP infrastructure for IMS communication network. In addition, public operators are currently engaged in the establishment of IP Interconnect network, providing required quality of media transfer for calls between operators.

This has spawned a need to be able to determine the quality of media transfer of a voice call, more in particular the quality of media transfer, in a Voice over IP (VoIP) communications network. More so, there is a need to be able to use the determined quality of media transfer, i.e. quality of media transfer, for e.g. optimising the IMS network dimensioning, topology, architecture and configuration, with the aim of further improving the quality of media transfer.

Thereto, it is an object of the invention to be able to monitor a quality of media transfer on the user plane in a SIP based VoIP communications network.

Thereto, according to the invention is provided a method for monitoring a quality of media transfer in a SIP based VOIP communications network comprising a first and second network node, the method including the steps of collecting, by the first network node, information representative of the quality of media transfer on the user plane, such as information included in one or more Real-time Transport Protocol Control Protocol (RTCP) messages related to that media transfer, including, by the first network node, in a SIP message said information representative of the quality of media transfer on the user plane, transmitting the SIP message from the first network node to the second network node, and storing in a repository associated with the second network node, e.g. a repository included by the second network node, the information representative of the quality of media transfer on the user plane. Herein, the quality of media transfer is preferably expressed as the number of lost (RTP) packets compared to the number of (RTP) packets transmitted.

Hence, the second network node may be informed of the quality of media transfer on the user plane by the first network node, wherein the quality of media transfer on the user plane is notified to the second node over the control plane.

It will be appreciated that media that is transported over the user plane includes Real-time Transport Protocol (RTP) messages and RTP Control Protocol (RTCP) messages. RTP messages and RTCP messages are generally carried over User Datagram Protocol/Internet Protocol (UDP/IP). The RTP messages, i.e. IP packets, contain the actual media packets, e.g. Pulse Code Modulation (PCM-)encoded speech samples. These RTP messages also contain supporting information such as sample sequence number and source identifier(s); the latter may be useful in the case of multiplexed media streams. The RTCP messages contain information related to the quality of the media transfer, such as the total number of RTP data packets transmitted since starting transmission, the total number of actual payload octets (excluding header and padding) transmitted in RTP data packets since starting transmission, the relative loss of RTP data packets, the cumulative loss of RTP data packets, and/or jitter for RTP data packets reception.

In the prior art methods, the control plane, i.e. SIP, is aware of the call establishment details as well as the negotiated codecs and IP address for the media transfer, e.g. via SDP. The call records, containing this information, may be used for statistics, e.g. determining the usage of certain codecs, bit rates and IP addresses.

According to an aspect of the invention, information representative of the quality of media transfer on the user plane, such as in particular a data item included in a RTCP message, is made available on the control plane and hence made available to a SIP application. Valuable information about the media transfer can therefore according to the invention be utilized by a SIP application or by an operation & maintenance node, to improve service behaviour.

Optionally, the method also includes reporting the quality of media transfer in the SIP based VOIP communications network.

Optionally, the information representative of the quality of media transfer on the user plane is included in the SIP message as a component in the SIP message body, optionally encoded in e.g. Multipurpose Internet Mail Extension (MIME) format or Extensible Markup Language (XML) format. Hence, the information representative of the quality of media transfer on the user plane can conveniently be transmitted from the first network node to the second network node.

Optionally, the method further includes including, by the second network node, in a SIP message, such as a SIP Invite message or a 200 Ok message, a request, requesting the first network node to collect the information representative of the quality of media transfer on the user plane and to include the information representative of the quality of media transfer on the user plane in a SIP message. Hence, the collecting and including of the information representative of the quality of media transfer on the user plane by the first network node can conveniently, e.g. selectively, such as at desired moments, be invoked by the second network node.

Optionally, the method further includes including, by the first network node, in a SIP message, such as a SIP Ack message or a 200 Ok message, a confirmation, confirming that the first network node collects information representative of the quality of media transfer on the user plane and includes the information representative of the quality of media transfer on the user plane in a SIP message. Hence, the second network node can conveniently be informed that the first network node collects the information representative of the quality of media transfer on the user plane and includes the information representative of the quality of media transfer on the user plane in a SIP message.

Optionally, the information representative of the quality of media transfer on the user plane, the request and/or the confirmation is included in the Session Description Protocol (SDP) in the SIP message.

Optionally, the information representative of the quality of media transfer on the user plane is included in a SIP message transmitted at the end of a SIP session, such as a SIP Bye message or a 200 Ok message. Thus, aggregated information representative of the quality of media transfer on the user plane can be provided for a call. Alternatively, or additionally, the information representative of the quality of media transfer on the user plane may be included in a SIP message transmitted during existence of a SIP session, such as a SIP Info message. Hence, it is possible to obtain information representative of the quality of media transfer on the user plane during a SIP session, e.g. allowing to adapt the SIP session accordingly.

Optionally, the first network node is a SIP User Agent (SIP-UA), Voice Call Continuity (VCC) terminal and/or Session Border Gateway (SBG).

Optionally, the second network node is a Proxy Call Session Control Function (P-CSCF), Serving Call Session Control Function (S-CSCF), SIP Application Server (SIP-AS) and/or VCC Application Server (VCC-AS).

Optionally, the information representative of the quality of media transfer includes information representative of one or more of sending network node packet count, sending network node octet count, number and/or ratio of packets lost, inter-arrival jitter of RTP data packets, and round-trip delay, for media contained in RTP messages that are transmitted by the first network node and/or received by the first network node.

The invention also relates to a method for monitoring a quality of media transfer in a VCC capable SIP based VOIP communications network comprising a VCC terminal and a VCC-AS, the method including the steps of collecting, by the VCC terminal, information representative of the quality of media transfer on the user plane, including, by the VCC terminal, in a SIP message transmitted during existence of a SIP session, such as a SIP Info message, said information representative of the quality of media transfer on the user plane, transmitting the SIP message from the VCC terminal node to the VCC-AS, and storing in a repository associated with the VCC-AS, the information representative of the quality of media transfer on the user plane.

The invention also relates to a network node for use in a SIP based VOIP communications network, arranged for collecting information representative of a quality of media transfer on the user plane, e.g. from information included in one or more RTCP messages related to that media transfer, including in a SIP message the information representative of the quality of media transfer on the user plane, and for transmitting said SIP message to a further network node. Such network node may e.g. be used as the first network node in the method as described above.

Optionally, the network node may be arranged for receiving a SIP message, such as a SIP Invite message or a 200 Ok message, including a request requesting the network node to collect the information representative of a quality of media transfer and to include the information in a SIP message, and arranged for, in response to said request, collecting information representative of a quality of media transfer on the user plane and including the information representative of a quality of media transfer on the user plane in a SIP message in response to receiving said request.

Optionally, the network node may be arranged for including in a SIP message, such as a SIP Ack message or a 200 Ok message, a confirmation, confirming that the network node collects the information representative of the quality of media transfer and includes the information representative of the quality of media transfer in a SIP message.

Optionally, the network node may be arranged for including the information representative of the quality of media transfer in a SIP message transmitted at the end of a SIP session, such as a SIP Bye message or 200 Ok message, and/or in a SIP message transmitted during existence of a SIP session, e.g. SIP Info message.

The invention also relates to a network node for use in a SIP based VOIP communications network, arranged for receiving a SIP message including information representative of a quality of media transfer on the user plane, such as information included in one or more RTCP messages, and for storing in a repository associated with the network node, e.g. in a repository of the network node, the information representative of the quality of media transfer on the user plane. Such network node may e.g. be used as the second network node in the method as described above.

Optionally, said network node is further arranged for including in a SIP message, such as a SIP Invite message or a 200 Ok message, a request, requesting a further network node to collect the information representative of the quality of media transfer and to include the information representative of the quality of media transfer in a SIP message and to transmit said SIP message to the network node when a designated event occurs.

In general, the network node according to the invention may be one of a SIP-UA, a VCC terminal, an SBG, a P-CSCF, a S-CSCF, a SIP-AS, or a VCC-AS.

The mechanism proposed in the present invention disclosure may be used also in combination with advanced IMS techniques like Voice call continuity (VCC) and Single radio voice call continuity (SR-VCC). Successful commercial deployment of VCC may require that adequate quality of media transfer information is made available to a VCC application server (VCC AS) in real-time, especially when media quality is deteriorating, which may result in the necessity to initiate access transfer to Global System for Mobile Communications (GSM) access.

BRIEF DESCRIPTION OF THE DRAWINGS

The invention will now be further elucidated by means of non-limiting examples referring to the drawings, in which

FIG. 3 shows an example of a calling SIP-UA reporting information representative of the quality of media transfer on the user plane to the associated SIP-AS;

FIG. 5 shows an example of a called SIP-UA reporting information representative of the quality of media transfer on the user plane to the associated SIP-AS;

FIG. 6 shows an example of a Quality of media transfer requested indication in SDP in a 200 Ok message;

FIG. 8 shows an example of an SBG reporting information representative of the quality of media transfer on the user plane to the associated SIP-AS;

FIG. 10 shows an example of a SIP-AS and an SBG both reporting information representative of the quality of media transfer on the user plane to the associated SIP-AS.

DETAILED DESCRIPTION

Figure 1:
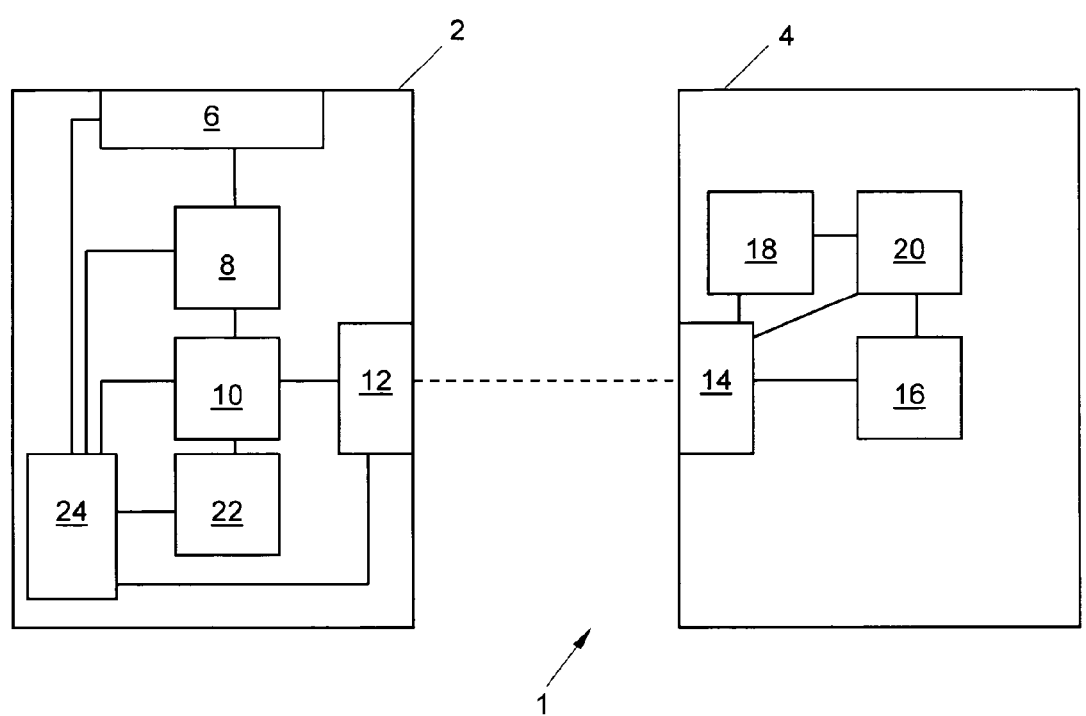
FIG. 1 shows a schematic drawing of a system according to the invention.

FIG. 1 shows a schematic drawing of a system according to the invention. FIG. 1 shows (part of a Session Initiation Protocol (SIP) based Voice over Internet Protocol (VoIP) communications network 1. In FIG. 1 the system comprises a first network node 2 and a second network node 4.

The first network node 2 comprises an input/output unit 6 arranged for receiving information representative of the quality of media transfer on the user plane. Said input/output unit 6 may e.g. be arranged for receiving Real-time Transport Protocol Control Protocol (RTCP) messages. These RTCP messages contain information relating to the quality of media transfer on the user plane, such as sending network node packet count, sending network node octet count, number and/or ratio of packets lost, inter-arrival jitter of Real-time Transfer Protocol (RTP) data packets, and round-trip delay.

The first network node 2 in this example further includes a collection unit 8 arranged for collecting the information representative of the quality of media transfer on the user plane, e.g. from one or more RTCP messages related to that media transfer. In FIG. 1 the first network node 2 further includes an inclusion unit 10 arranged for including the collected information representative of the quality of media transfer on the user plane in a SIP message. The first network unit in this example further includes a SIP input/output unit 12 arranged for transmitting the SIP message including the collected information, in this example to the second network node 4.

The second network node comprises a SIP input/output unit 14 arranged for receiving the SIP message including the collected information, in this example from the first network node 2. The second network node 4 also has a repository 16 associated therewith. In this example the repository 16 is included by the second network node 4. It will be appreciated, however, that the repository 16 may also be external to the second network node 4.

In the example of FIG. 1, the second network node 4 further includes a request generation unit 18 arranged for generating a request. The request generation unit 18 may include the request in a SIP message, such as a SIP Invite message or a 200 Ok message. The request is intended for causing the first network node 2 to collect the information relating to the quality of media transfer on the user plane, to include the information relating to the quality of media transfer on the user plane in a SIP message, and to transmit said SIP message to the second network node 4. The SIP message including the request may be transmitted towards the first network node 2 using the SIP input/output unit 14. The second network unit 4 in this example includes a processing unit 20 for controlling the SIP input/output unit 14, the repository 16 and the request generation unit 18.

The first network node 2 is arranged for receiving the SIP message including the request, e.g. using the SIP input/output unit 12. In this example, the first network node 2 includes a confirmation unit 22 arranged for generating a confirmation confirming that the first network node 2 will collect the information representative of the quality of media transfer, will include said information in a SIP message, and will transmit said message to the requesting second network node 4. The confirmation may be included, e.g. by the inclusion unit 10, in a SIP message, such as a SIP Ack message or a 200 Ok message, to be sent to the requesting second network node.

In the example of FIG. 1, the first network node 2 includes a control unit 24. The control unit 24 is, in this example, arranged for controlling the input/output unit 6, the collection unit 8, the inclusion unit 10, the SIP input/output unit 12, and the confirmation unit 22. In FIG. 1, the control unit is arranged to control the first network node 2 such that in response to receiving the request the first network node 1 collects the information representative of the quality of media transfer, includes the information in a SIP message, and transmits said SIP message to the second network node 4.

It will be appreciated that it is also possible that the first network node 2 collects information representative of the quality of media transfer of its own motion, and includes the information in a SIP message, and transmits said SIP message to the second network node 4 in response to receiving the request. It will be appreciated that it is not necessary that the first network node 2 transmits said SIP message to the second network node immediately upon receiving the request, e.g. included in a SIP Info message. It is for instance possible that said SIP message including the information representative of the quality of media transfer is transmitted to the second network node 4 at the end of a call, e.g. included in a SIP Bye message or a 200 Ok message.

It will be appreciated that the first network node 2 need not communicate with the second network node 4 directly. It is possible that further network nodes relay the SIP messages from the first network node 2 to the second network node 4 and vice versa.

The first network node 2 may e.g. be a SIP User Agent (SIP-UA), Voice Call Continuity (VCC) terminal and/or Session Border Gateway (SBG). The second network node may e.g. be a Proxy Call Session Control Function (P-CSCF), Serving Call Session Control Function (S-CSCF), SIP Application Server (SIP-AS) and/or VCC Application Server (VCC-AS).

Figure 2:
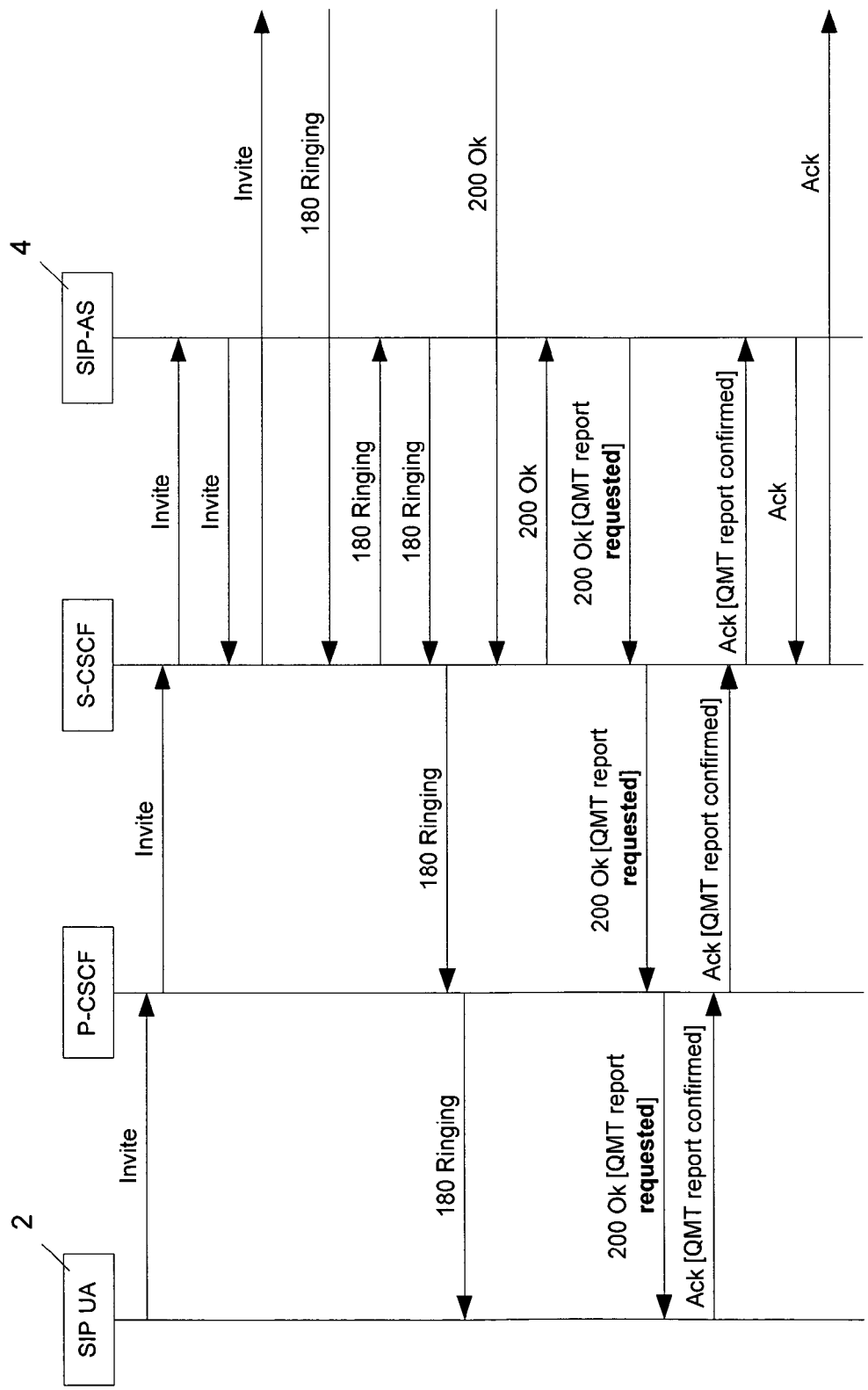
FIG. 2 shows a schematic representation of a part of a first embodiment of a method according to the invention.

FIG. 2 shows a schematic representation of a first embodiment of a method according to the invention. In the example of FIG. 2 a quality of media transfer report is requested from the calling party. In the figures "quality of media transfer" is indicated with "QMT" for brevity. Such quality of media transfer report is to include information representative of the quality of media transfer on the user plane. In the example of FIG. 2 a calling SIP User agent (SIP-UA) sends a SIP Invite message towards a called SIP-UA (not shown). The SIP Invite message traverses the P-CSCF, S-CSCF and SIP-AS of the calling party.

The example of FIG. 2 shows that the SIP-AS, controlling the call from the calling party, includes a request for quality of media transfer report indication in the 200 Ok message to the calling party. It is assumed, in this example, that a Session Description Protocol (SDP) response from the called party is included in the 200 Ok message. The request for quality of media transfer report indication is added to the SDP in the 200 Ok message. The calling party confirms the quality of media transfer report request by including a quality of media transfer report confirmed indication in the SIP Ack message. The quality of media transfer report confirmed indication may be added to the SDP in the SIP Ack message. Since the quality of media transfer report confirmed indication is meant for the benefit of the SIP-AS, the SIP-AS will remove it form the SDP in the SIP Ack message prior to passing the SIP Ack message on towards the called party SIP-UA. If it would not be required for the called SIP-UA that the SIP Ack message contains SDP, then the SIP-AS may remove the SDP from the SIP Ack message prior to passing the SIP Ack message on.

Figure 3:
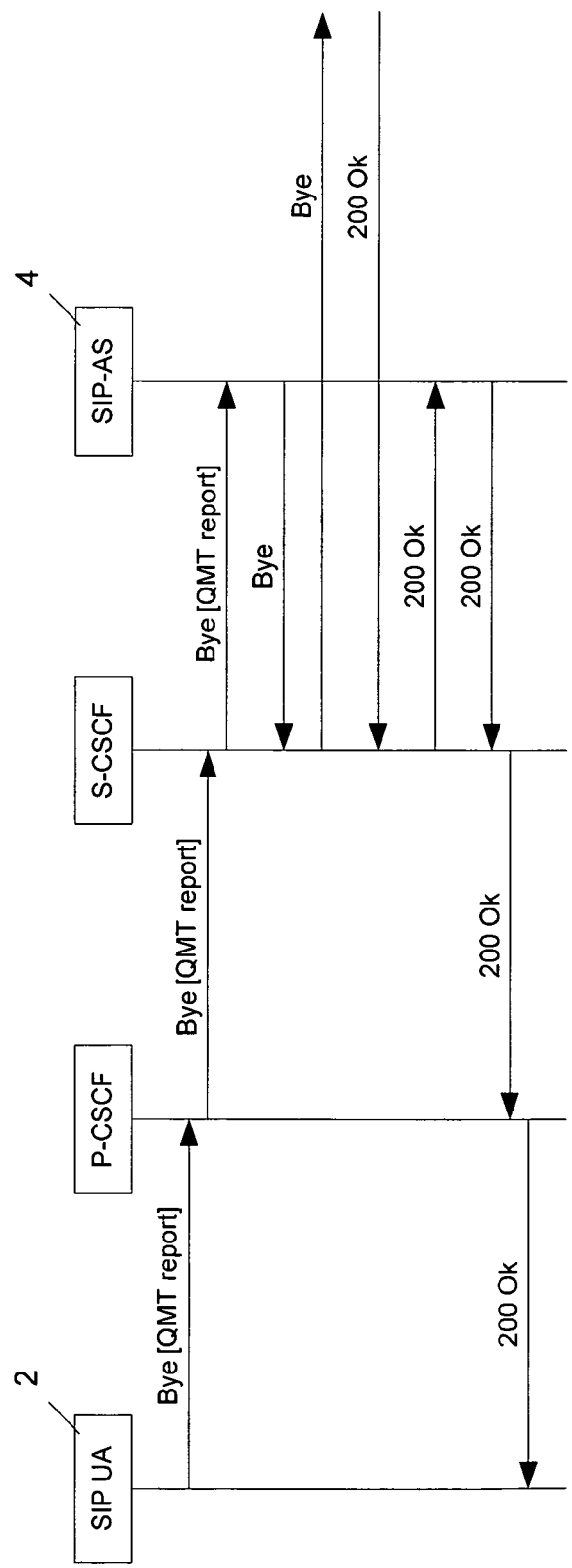

FIG. 3 shows an example of a calling SIP-UA reporting information representative of the quality of media transfer on the user plane to the associated SIP-AS. In this example, FIG. 3 shows how the calling SIP-UA may, at the end of the call, report the quality of media transfer related to the RTP media stream, to the associated SIP-AS. It will be appreciated that herein the calling SIP-UA (or a user equipment wherein the SIP-UA resides) acts as the first network node 2, and the SIP-AS acts as the second network node 4.

In FIG. 3 is shown that when the calling SIP-UA initiates a SIP Bye message, it includes the quality of media transfer report, i.e. the information representative of the quality of media transfer on the user plane, in the SIP Bye message. The quality of media transfer report may be included as a designated SIP body. Said designated SIP body may e.g. be encoded in MIME or XML format. In this example, the SIP-AS reads the quality of media transfer report from the SIP Bye message and removes the quality of media transfer report prior to passing the SIP Bye message on to the called SIP-UA.

Figure 4:
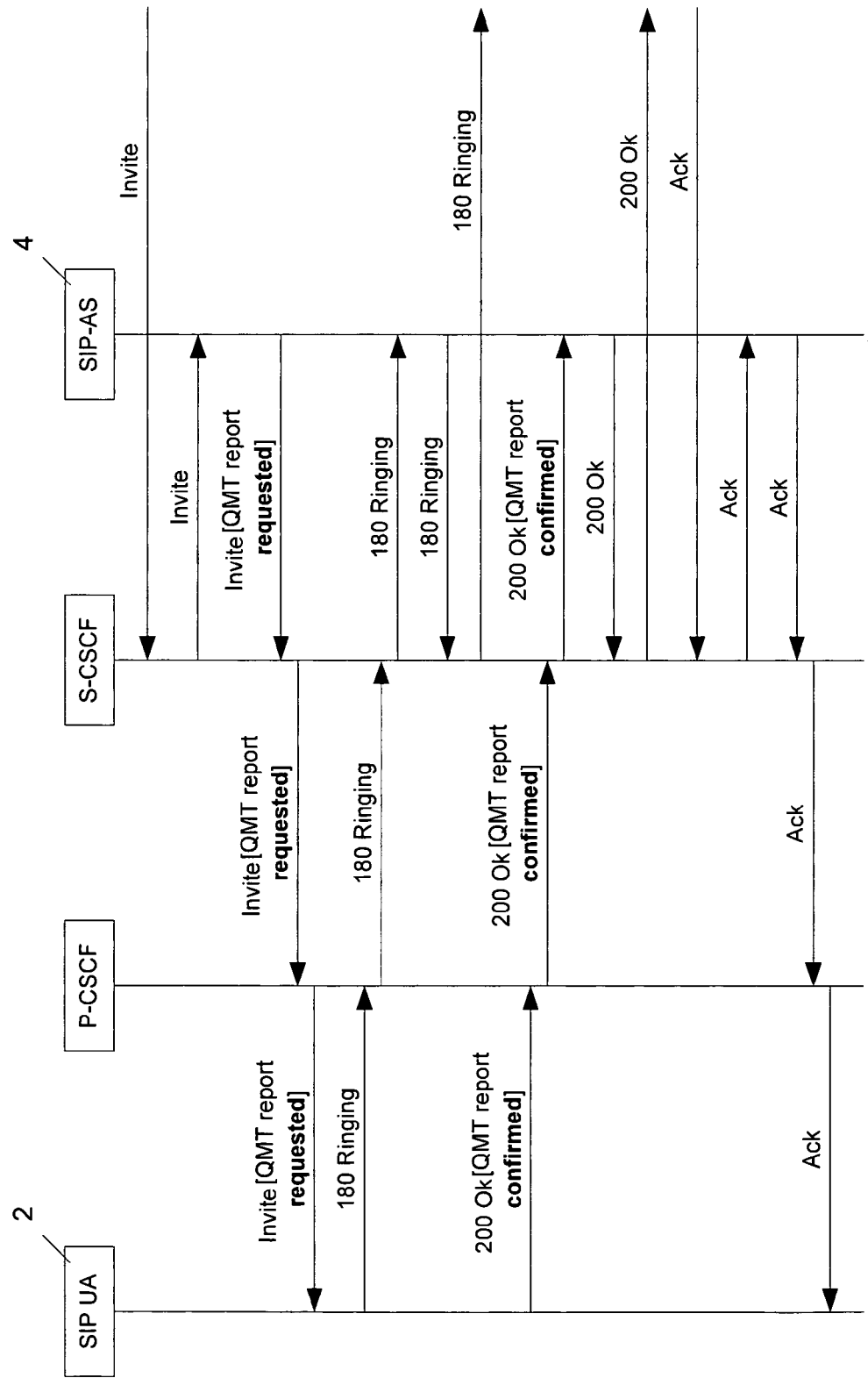
FIG. 4 shows a schematic representation of a part of a second embodiment of a method according to the invention.

FIG. 4 shows a schematic representation of a second embodiment of a method according to the invention. In the example of FIG. 4 a quality of media transfer (QMT) report is requested from the called party. In the example of FIG. 4 a calling SIP-UA (not shown) sends a SIP Invite message towards a called SIP-UA. The SIP Invite message traverses the SIP-AS, S-CSCF, and P-CSCF of the called party.

For this example of a terminating call case, as depicted in FIG. 4, the quality of media transfer report requested indicator is included (added to SDP offer) by the SIP-AS into the SIP Invite message. The quality of media transfer report confirmed indicator is included (added to SDP answer) by the called SIP-UA into the 200 Ok message. The SIP-AS removes the quality of media transfer report confirmed indicator from the 200 Ok message prior to passing the 200 Ok message on to the calling SIP-UA.

Figure 5:
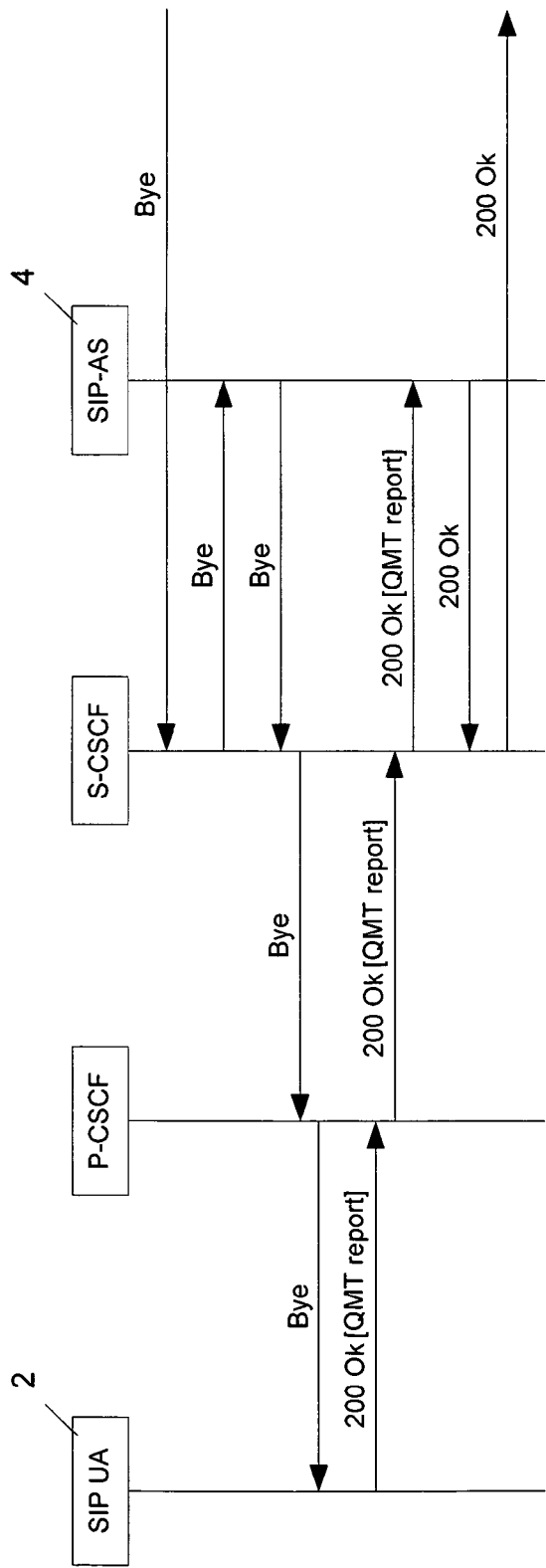

FIG. 5 shows an example of a called SIP-UA reporting information representative of the quality of media transfer on the user plane to the associated SIP-AS. In this example, FIG. 5 shows how the called SIP-UA may, at the end of the call, report the quality of media transfer related to the RTP media stream, to the associated SIP-AS. It will be appreciated that herein the called SIP-UA (or a user equipment wherein the SIP-UA resides) acts as the first network node 2, and the SIP-AS acts as the second network node 4.

When, in this example, the called SIP-UA responds with a 200 Ok message on the SIP Bye message, it includes the quality of media transfer report in the SIP Bye message. The quality of media transfer report may be included as a designated SIP body. Said designated SIP body may e.g. be encoded in MIME or XML format. In this example, the SIP-AS reads the quality of media transfer report from the 200 Ok message and removes the quality of media transfer report prior to passing the 200 Ok message on.

For the case that the SIP-UA initiates a call, a SIP-AS that is controlling this call may include the quality of media transfer report requested indication in the SDP in the SIP 200 Ok message. This inclusion may be done through a designated media attribute, as depicted in FIG. 6.

The requested media quality of media transfer report is associated with a specific media stream. A media stream is, in turn, associated with a specific SIP dialogue. When multiple early dialogues exist during SIP session establishment, each dialogue may have a media stream associated with it. The SDP related to each media stream may have its own quality of media transfer request. The reporting of quality of media transfer results for an early dialogue that does not lead to an established dialogue, may be triggered explicitly by the receiving of a 199 provisional response or may be done implicitly, when a 200 Ok message is received on one of the other early dialogues, implying that the dialogues other than the dialogue on which 200 Ok message is received will not transit to established dialogue and further implying that no further media transmission shall take place on those dialogues.

The SDP answer, including the quality of media transfer report requested indication, may be included in a 183 Session progress message, possibly with a reliable transmission request (100rel), instead of in a 200 Ok message.

When the SIP-UA sends a SIP Ack message, it may include SDP in the SIP Ack message, containing the following Media attribute:

Media Attribute (a): QMTReportConfirmed

The SIP-AS may remove this media attribute before forwarding the SIP Ack message.

When the SDP answer, including the quality of media transfer report requested indication, would be sent in a 183 Session progress message with 100rel, then the quality of media transfer report confirmed indication may be sent in a SIP PRACK message.

Figure 7:
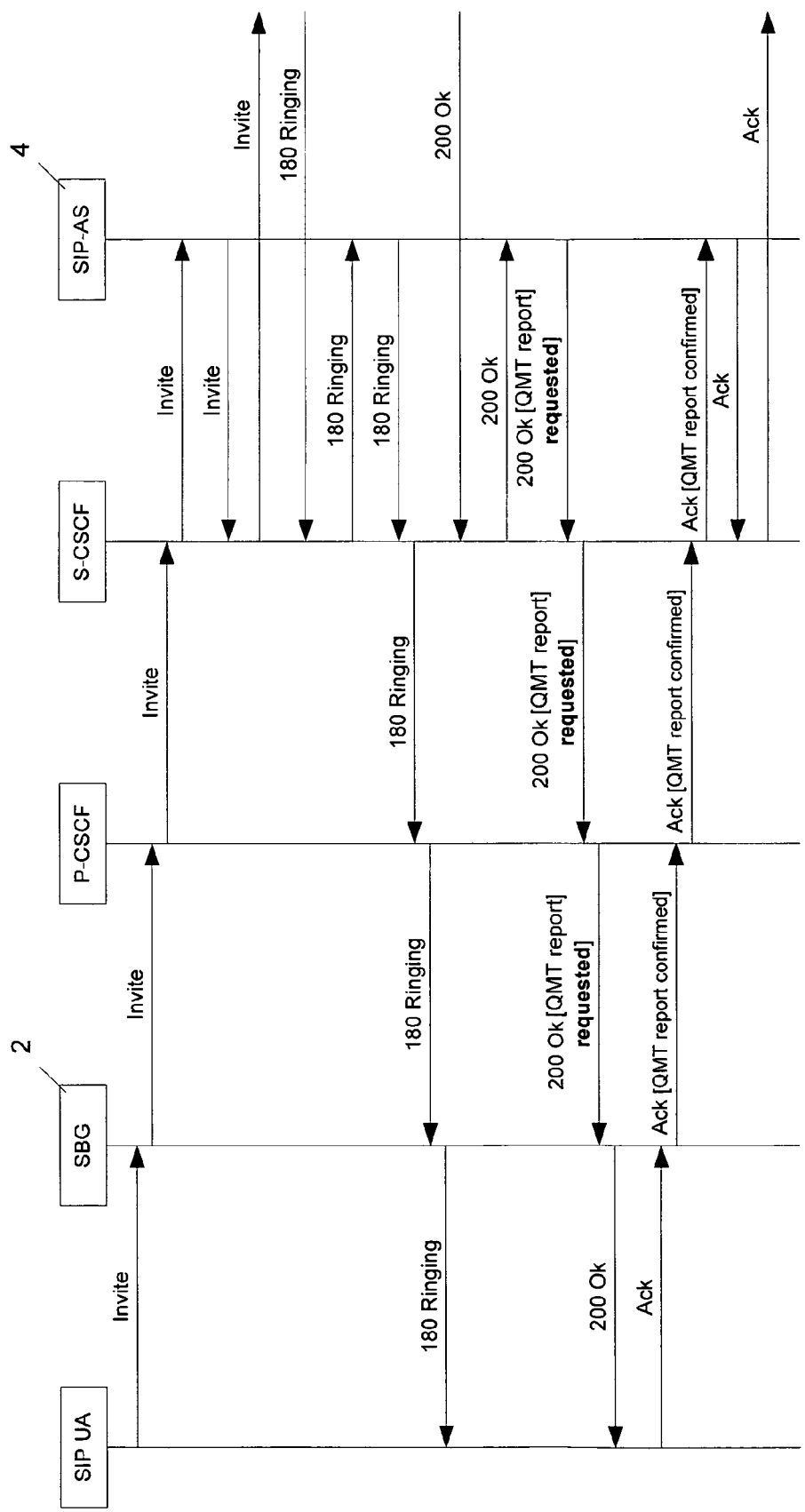
FIG. 7 shows a schematic representation of a part of a third embodiment of a method according to the invention.

FIG. 7 shows a schematic representation of a third embodiment of a method according to the invention. In the example of FIG. 7 a call is initiated by a calling SIP-UA towards a called SIP-UA (not shown). The SIP Invite message traverses a SBG, P-CSCF, S-CSCF and SIP-AS. In this example, the SBG is requested to generate quality of media transfer reports, for a call initiated by the SIP-UA. It will be appreciated that herein the SBG acts as the first network node 2, and the SIP-AS acts as the second network node 4.

Figure 8:
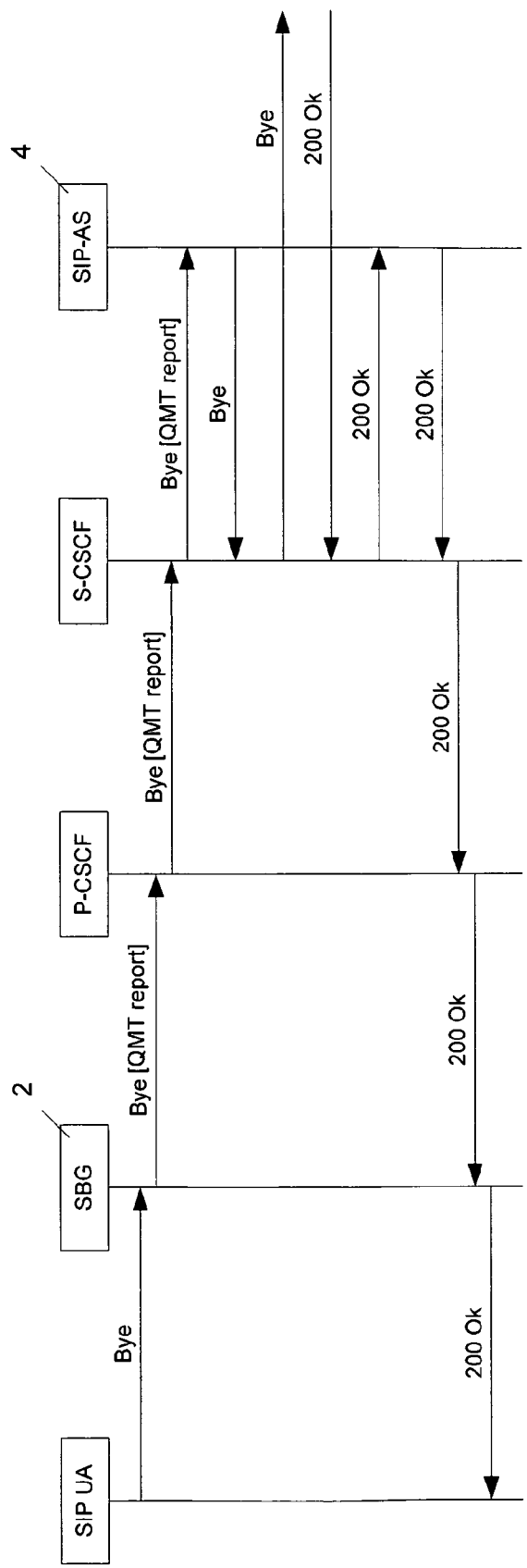

FIG. 8 shows how the SBG may send the requested quality of media transfer reports, when the calling SIP-UA initiates the termination of the call.

The quality of media transfer report requested indicator, the quality of media transfer report confirmed indicator as well as the actual quality of media transfer report may be included in the SIP messages as described with respect to FIG. 2 and FIG. 3.

In the example of FIG. 7 and FIG. 8, the quality of media transfer report is generated based on the quality of media transfer as experienced by the SBG. This may differ from the quality of media transfer experienced by the SIP-UA. The quality of media transfer reported by SBG shall relate to information representative of the quality of media transfer on the user plane between the SBG and the SIP-UA, e.g. based on the RTP/RTCP data streams between the SBG and the SIP-UA. The SBG includes a control part, the Session border control (SBC) and a media part, a Media proxy (MP). SIP signalling traverses the SBC. The SBC controls media transfer through the MP. This enables the SBC to request the MP to accumulate quality of media transfer data for a specific RTP/RTCP data stream and to provide these data to the SBC when this RTP/RTCP data stream is ended.

Figure 9:
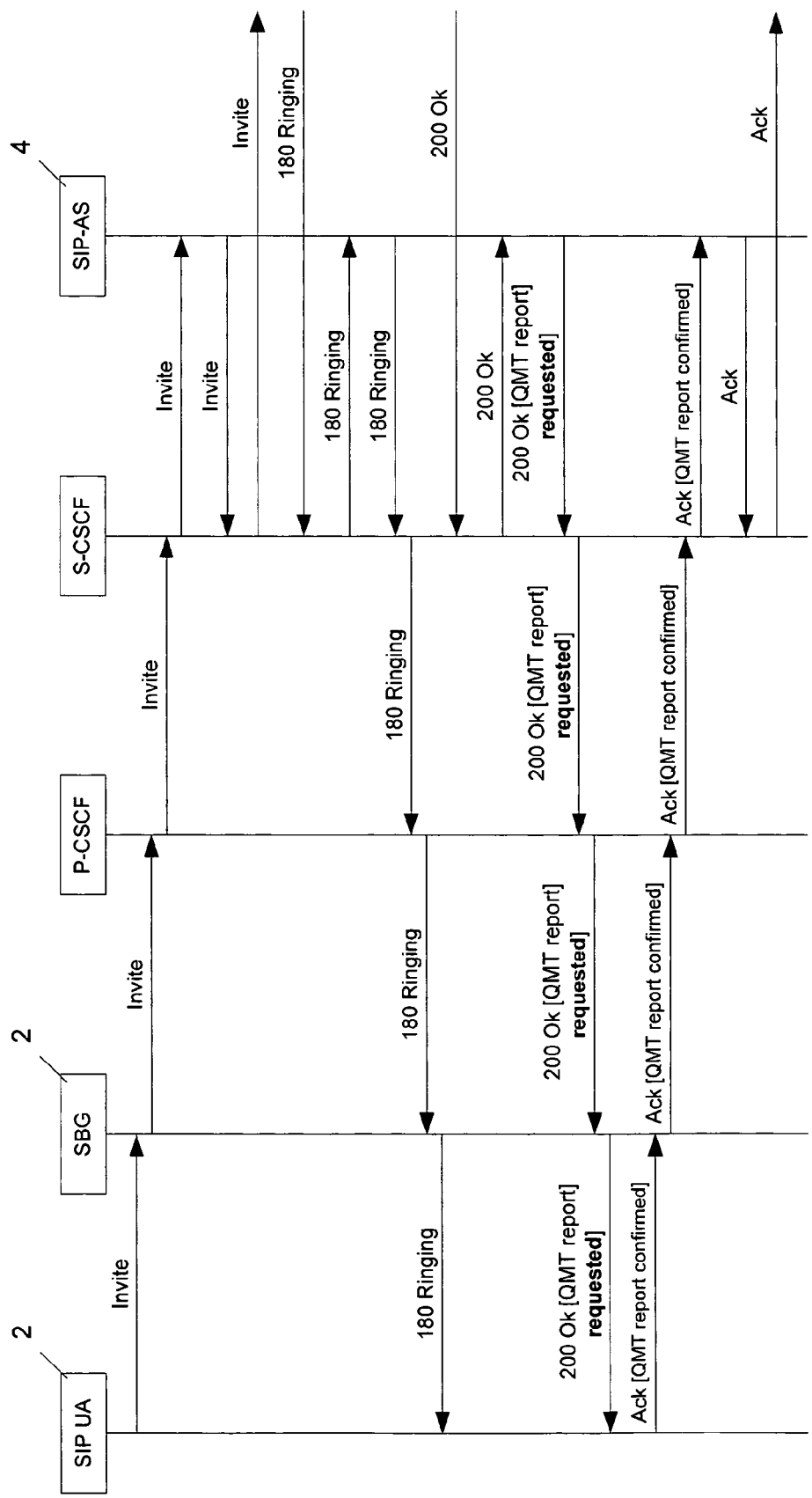
FIG. 9 shows a schematic representation of a part of a fourth embodiment of a method according to the invention.

FIG. 9 shows a schematic representation of a fourth embodiment of a method according to the invention. In the example of FIG. 9 a call is initiated by a calling SIP-UA towards a called SIP-UA (not shown). The SIP Invite message traverses an SBG, P-CSCF, S-CSCF and SIP-AS. In this example, both the calling SIP-UA and SBG generate a quality of media transfer report, on request from the IMS core network, in this example from the SIP-AS. It will be appreciated that herein both the calling SIP-UA (or a user equipment wherein the SIP-UA resides) and the SBG act as first network nodes 2, and the SIP-AS acts as the second network node 4.

In this example, the SIP-UA includes a quality of media transfer report confirmed indication in the SIP Ack message. The SBG will, when forwarding the SIP Ack message towards the P-CSCF, also add a quality of media transfer report confirmed indication in the SIP Ack message (e.g. as a separate media attribute line). For this example, the quality of media transfer report requested indication may be differentiated in a quality of media transfer report requested from the SIP-UA indication and a quality of media transfer report requested from SBG indication, as separate media attribute lines. Alternatively, a single quality of media transfer report requested indication may be used.

Figure 10:
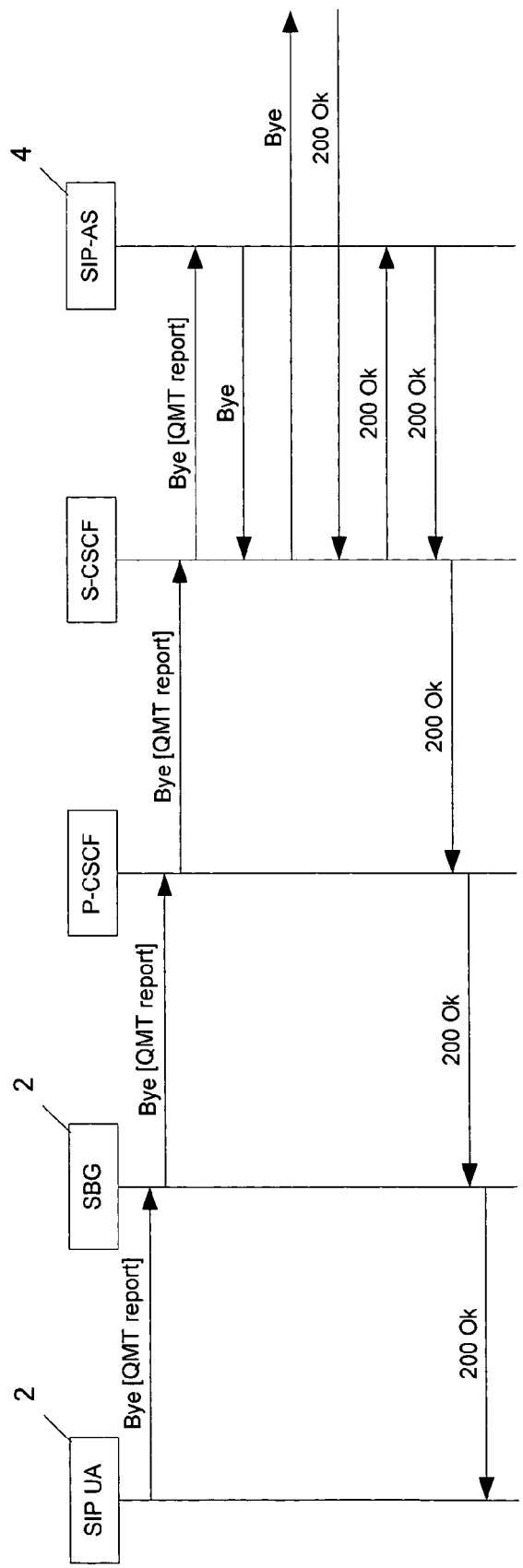

FIG. 10 shows how both the SIP-UA and the SBG may send a quality of media transfer report including information representative of the quality of media transfer on the user plane towards the IMS core network, in this example to the SIP-AS. When the SBG receives the SIP Bye message, including the quality of media transfer report from the SIP-UA, it includes its own quality of media transfer report. So, the SIP Bye message from the SBG towards the IMS core network will contain two quality of media transfer reports. The SIP-AS removes the quality of media transfer reports before passing the SIP Bye message on.

It will be appreciated that information representative of the quality of media transfer on the user plane related to the inbound RTP data stream (from remote party to SIP UA) is known by the SIP-UA, being the receiver of the inbound data stream. The information representative of the quality of media transfer on the user plane related to the outbound RTP data stream (from the SIP-UA towards a remote party) is not known by the SIP-UA, but that information representative of the quality of media transfer on the user plane is known by the SBG, being the receiver of the outbound data stream. Hence, when obtaining the quality of media transfer report only from the SIP-UA, it is possible to have the SIP-UA obtain the quality of media transfer related to the outbound data stream from the RTCP Sender Report/Receiver Report messages, sent from the SBG to the SIP-UA. Conversely, when obtaining the quality of media transfer report only from the SBG, it is possible to have the SBG obtain the quality of media transfer related to the inbound data stream from the RTCP Sender Report/Receiver Report messages, sent from the SIP-UA to the SBG.

Obtaining the quality of media transfer report from the SIP-UA has the advantage that this can be performed when no SBG is present, e.g. for mobile access assuming it's not desirable to make Gateway GPRS (General Packet Radio Service) Support Node (GGSN) SIP-aware (SIP signalling compression & security may be applied). Another advantage is that the quality of media transfer reports may include characteristics of lower layers in the Open Systems Interconnection (OSI) stack, such as Wireless Local Area Network (WLAN) Internet Protocol (IP) connectivity.

Obtaining the quality of media transfer report from the SBG has the advantage that this has no impact on the SIP-UA. Another advantage is that enhancement to the SBG, for collecting and reporting quality of media transfer reports, may be modified and/or enhanced when needed.

The quality of media transfer report, when generated by the SIP-UA, will be based on RTCP messages as received by the SIP-UA. The quality of media transfer report may contain one or more of sending network node packet count, sending network node octet count, number and/or ratio of packets lost, inter-arrival jitter of RTP data packets, and round-trip delay. This information may be recorded and reported for both the outbound RTP data stream (from the SIP-UA towards a remote party) and the inbound RTP data stream (from a remote party to the SIP-UA). The round-trip delay will be the round-trip delay between the SIP-UA and the SBG and not between SIP-UA and destination party. However, this round-trip delay between the SIP-UA and the SBG may be useful information.

Besides sending one or more quality of media transfer report at the end of an RTP data session, it is possible to generate one or more quality of media transfer reports during the existence of an RTP data session. Such quality of media transfer report generated during the existence of an RTP data session is also referred to as intermediate quality of media transfer report herein.

The following example uses quality of media transfer reports during the existence of an RTP data session. A voice call continuity (VCC) capable terminal has the capability to switch between WLAN access and Global System for Mobile Communications (GSM) access, for voice calls. While a VCC terminal has an active voice call through WLAN, it monitors the quality of media transfer of the WLAN connection. In this example, the 'quality of media transfer of the WLAN connection' may entail both (i) quality of the IP data communication through WLAN (OSI stack layer 3) and (ii) quality of the RTP data session (OSI stack layer 5). When the quality of media transfer falls below a predetermined threshold, the VCC terminal in this example initiates an access transfer to GSM and performs an IMS deregistration. It will be appreciated that the VCC terminal may determine that the data connection quality of media transfer has fallen below the threshold for voice communication, but that this data connection is still sufficient for other IMS services, such as Presence or Network based address book. In such case, the VCC terminal may remain registered, but may inform the S-CSCF about the change in terminal/communication capability. Timely determination about the decrease in WLAN quality of media transfer is crucial in order to perform seamless access transfer and to perform IMS deregistration.

When a particular WLAN access point (AP) is used by a large number of VCC terminals, then the characteristics of the data connection will be dependent on, among others, the number of users of the WLAN connection (for voice or other services), the position of these users (relative to the WLAN AP) and the movement of these users.

To facilitate a VCC application server (VCC-AS) to keep track of the quality of the data connection for WLAN based voice calls, intermediate quality of media transfer reports may be used. This entails that the VCC terminal will send a quality of media transfer report at designated intervals, as instructed by the VCC-AS. It will be appreciated that herein the VCC terminal acts as the first network node 2, and the VCC-AS acts as the second network node 4.

In the present example, the following mechanisms are hereto proposed.

When a voice call is established to or from a VCC terminal, the VCC-AS requests the VCC terminal to generate regular intermediate quality of media transfer reports as described above. Since the VCC-AS keeps track of the quality of media transfer experienced by the various VCC terminals connected to this WLAN AP, it makes an estimate of the stability of the WLAN signal. Hereto, the VCC terminal may include characteristics of the WLAN data communication ('radio report') in the SIP Invite message or in the 183 Session progress message, depending on the call case.

When the VCC-AS determines at some moment during the call that the WLAN signal is deteriorating or improving, based on the intermediate quality of media transfer reports it receives from this VCC terminal, and optionally from other terminals, it may use a re-Invite method to request the VCC terminal to increase or decrease the rate at which intermediate quality of media transfer reports are generated. The re-Invite contains an SDP with a quality of media transfer report requested attribute line with a modified interval-time. The VCC terminal responds with a 200 Ok message, including an SDP with a quality of media transfer report confirmed attribute line.

At the defined interval moments, the VCC terminal uses a SIP Info message to send an intermediate quality of media transfer report to the VCC-AS. Since the VCC-AS is acting as Back-to-back user agent, it is able to prevent that this SIP Info message is sent further towards the destination subscriber.

In the foregoing specification, the invention has been described with reference to specific examples of embodiments of the invention. It will, however, be evident that various modifications and changes may be made therein without departing from the broader spirit and scope of the invention as set forth in the appended claims.

According to an aspect of the invention, a SIP-AS receives quality of media transfer information for a Voice-over-IP call. The quality of media transfer information includes information representative of the quality of media transfer on the user plane. The SIP-AS may request the quality of media transfer information for selected calls. The received quality of media transfer information may be placed in a charging record related to the VOIP call. This method may be used for analyzing network performance.

The method may also be used in combination with Voice call continuity. The method allows the VCC application server to gain Radio reports from the VCC terminal, related to the quality of the WLAN radio connection. VCC-AS may use this information for improved support of access transfer, i.e. forming a 'radio quality map', supporting the VCC-AS in its decision when to establish calls through WLAN or through GSM and when to request the terminal to initiate access transfer between WLAN and GSM.

In the example of FIG. 7 and FIG. 8 is shown to obtain a quality of media transfer report from an SBG for a calling SIP-UA. It will be appreciated that it is also possible to obtain a quality of media transfer report from an SBG for a called SIP-UA.

In the example of FIG. 9 and FIG. 10 is shown to obtain a quality of media transfer report from both a SIP-UA and an SBG for a calling SIP-UA. It will be appreciated that it is also possible to obtain a quality of media transfer report from both a SIP-UA and an SBG for a called SIP-UA.

However, other modifications, variations, and alternatives are also possible. The specifications, drawings and examples are, accordingly, to be regarded in an illustrative rather than in a restrictive sense.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A method for monitoring a quality of media transfer in a Session Initiation Protocol (SIP) based Voice over Internet Protocol (VoIP) communications network comprising first and second network nodes, the method comprising:
    the first network node updating the second network node with quality information representative of a quality of a media transfer on a user plane of a first early dialog associated with establishment of a SIP session supporting a particular VoIP call, the updating comprising:
        collecting the quality information at the first network node;
        detecting a response to a second early dialog associated with the establishment of the SIP session supporting the VoIP call; and
        in response to the detecting, transmitting a first SIP message comprising the quality information to the second network node;
    wherein the first early dialog is distinct from the second early dialog.

2. The method of claim 1:
    wherein the quality information is included in the message body of the first SIP message.

3. The method of claim 1, wherein detecting the response to the second early dialog comprises receiving, by the first network node from the second network node and upon initiation of the SIP session supporting the VoIP call, a second SIP message requesting that the first network node collect the quality information and include the quality information in the first SIP message.

4. The method of claim 1, further comprising the first network node transmitting at least one additional SIP message comprising additional quality information to the second network node before the detecting of the end of the SIP session supporting the VoIP call, the additional quality information being representative of the quality of an additional media transfer on the user plane of the particular VoIP call.

5. The method of claim 1, wherein the first network node is a Voice Call Continuity terminal.

6. The method of claim 1, wherein the second network node is a Proxy Call Session Control Function.

7. The method of claim 1, wherein the second network node is a Serving Call Session Control Function.

8. The method of claim 1:
wherein the collecting of the quality information comprises Real-time Transport Protocol messages that are transmitted and/or received by the first network node; and
wherein the quality information includes information representative of at least one of:
sending network node packet count;
sending network node octet count;
number of packets lost;
ratio of packets lost;
inter-arrival jitter of Real-time Transport Protocol data packets; and
round-trip delay.

9. The method of claim 1, wherein the quality information is transmitted to the second network node for storage in a repository associated with the second network node.

10. The method of claim 1, wherein the first network node is a Session Border Gateway.

11. The method of claim 1, wherein the second network node is a Voice Call Continuity Application Server.

12. A first network node for use in a Session Initiation Protocol (SIP) based Voice over Internet Protocol (VoIP) communications network, the network node comprising:
a hardware processor, network adapter, and a memory, the memory containing instructions executable by the hardware processor whereby the first network node is configured to:
update a second network node with quality information representative of a quality of media transfer on a user plane of a first early dialog associated with establishment of a SIP session supporting a particular VoIP call, the updating comprising:
collecting the quality information;
detecting a response to a second early dialog associated with the establishment of the SIP session supporting the VoIP call; and
in response to the detecting, transmitting, via the network adapter, a first SIP message comprising the quality information to the second network node;
wherein the first early dialog is distinct from the second early dialog.

13. The first network node of claim 12, wherein in order to detect the response to the second early dialog, the first network node is configured to receive, from the second network node and upon initiation of the SIP session supporting the VoIP call, a second SIP message requesting that the first network node collect the quality information and include the quality information in the first SIP message.

14. The first network node of claim 12, wherein the first network node is further configured to transmit, via the network adapter, at least one additional SIP message comprising additional quality information to the second network node before the detecting of the end of the SIP session supporting the VoIP call, the additional quality information being representative of the quality of an additional media transfer on the user plane of the particular VoIP call.

15. The first network node of claim 12 wherein the first network node is a Voice Call Continuity terminal.

16. The first network node of claim 12, wherein the first network node is a Session Border Gateway.

17. The first network node of claim 12:
wherein the first network node is configured to include the quality information in the message body of the first SIP message.

18. A second network node for use in a Session Initiation Protocol (SIP) based Voice over Internet Protocol (VoIP) communications network, the network node comprising:
a hardware processor configured to control a network adapter;
the network adapter;
a physical storage operatively connected to the hardware processor; and
a memory containing instructions executable by the hardware processor whereby the second network node is configured to:
transmit, via the network adapter and to a first network node, a response to a second early dialog associated with establishment of a SIP session supporting a particular VoIP call;
in response to the transmitting, receive, via the network adapter and from the first network node, a first SIP message that includes quality information representative of a quality of media transfer on a user plane of a first early dialog associated with the establishment of the SIP session supporting the particular VoIP call, the first early dialog being distinct from the second early dialog;
store the quality information in the physical storage.

19. The second network node of claim 18, wherein the second network node is configured to transmit the response to the second early dialog in a second SIP message, via the network adapter to the first network node, the second SIP message, requesting the first network node to:
collect the quality information; and
transmit the quality information, via the first SIP message, to the second network node.

20. The second network node of claim 18, wherein the second network node is a Proxy Call Session Control Function.

21. The second network node of claim 18, wherein the second network node is a Serving Call Session Control Function.

22. The second network node of claim 18, wherein the second network node is a Voice Call Continuity Application Server.

* * * * *